United States Patent [19]

Garuts

[11] 3,733,514

[45] May 15, 1973

[54] WIDE BAND AMPLIFIER HAVING TWO SEPARATE HIGH AND LOW FREQUENCY PATHS FOR DRIVING CAPACITIVE LOAD WITH LARGE AMPLITUDE SIGNAL

[75] Inventor: Valdis E. Garuts, Beaverton, Oreg.

[73] Assignee: Tektronix, Inc., Beaverton, Oreg.

[22] Filed: Mar. 19, 1971

[21] Appl. No.: 126,083

[52] U.S. Cl. ....................315/27 TD, 330/126

[51] Int. Cl. ....................H01j 29/70

[58] Field of Search ....................315/27 TD, 27 R; 330/126, 9

[56] References Cited

UNITED STATES PATENTS

| | | | |
|---|---|---|---|
| 2,935,695 | 5/1960 | Wlasuk | 330/126 |
| 3,434,004 | 3/1969 | Smeulers et al. | 315/27 TD |
| 3,296,464 | 1/1969 | Brault | 330/126 |
| 2,879,445 | 3/1959 | Gordor | 315/22 |

*Primary Examiner*—Carl D. Quarforth
*Assistant Examiner*—J. M. Potenza
*Attorney*—Buckorn, Blore, Klarquist & Sparkman

[57] ABSTRACT

A wide frequency bandwidth amplifier circuit for driving an output load capacitance with large amplitude signals is described in which two separate paths are provided for low frequency and high frequency portions of such signal. The low frequency path is provided by a shunt feedback amplifier connected as an operational amplifier, while the high frequency path is formed by a series feedback amplifier. The gain of the series feedback amplifier, determined by the ratio of its series feedback capacitance divided by the output load capacitance, is made equal to the gain of the operational amplifier, determined by the ratio of its shunt feedback resistance divided by its input coupling resistance. The low frequency cutoff of the high frequency path is above the high frequency cutoff of the low frequency path. Thus, in one embodiment of the amplifier circuit with a frequency response of D.C. to 200 megahertz, the high frequency path has a response of one megahertz to 200 megahertz and the low frequency path has a response of D.C. to 30 megahertz. This embodiment is used as a horizontal sweep amplifier for driving the horizontal deflection plates of a cathode ray oscilloscope with a ramp shaped output signal of 80 volts amplitude and three nanoseconds rise time.

15 Claims, 3 Drawing Figures

VALDIS E. GARUTS
INVENTOR
BY
BUCKHORN, BLORE, KLARQUIST & SPARKMAN
ATTORNEYS

WIDE BAND AMPLIFIER HAVING TWO SEPARATE HIGH AND LOW FREQUENCY PATHS FOR DRIVING CAPACITIVE LOAD WITH LARGE AMPLITUDE SIGNAL

BACKGROUND OF THE INVENTION

The subject matter of the present invention relates generally to electrical signal amplifier circuits of wide band frequency response which are employed to drive a capacitive load with large amplitude output signals, and in particular, to such amplifiers in which two separate paths are provided for the low frequency and high frequency portions of the signal to increase the high frequency response of the amplifier. The low frequency path is provided by a shunt feedback amplifier connected as an operational amplifier, and the high frequency path is formed by a series feedback amplifier. The gains of the two paths are made substantially the same, and the low frequency cutoff of the high frequency path is made below the high frequency cutoff of the low frequency path. There is no frequency matching problem for the two paths because the high frequency path only operates long enough to enable the low frequency path to take over the amplification. As a result, for fast rise time signals, the output load capacitance is initially charged very rapidly by the signal portion flowing through the high frequency path and such charge voltage is maintained quite accurately by the signal portion flowing through the low frequency path. Thus, the circuit of the present invention combines the good high frequency response of a series feedback amplifier with the good low frequency and D.C. response of the shunt feedback amplifier. In addition, since the shunt feedback amplifier is connected as an operational amplifier, it has extremely low output impedance which prevents any appreciable drift in the D.C. output voltage level.

The amplifier of the present invention is especially useful in a cathode ray oscilloscope either as the horizontal sweep amplifier connected to the horizontal deflection plates of the cathode ray tube of such oscilloscope, or as the unblanking amplifier driving the control grid of such tube. However, it can also be employed to drive any capacitive load.

Previous horizontal sweep amplifiers have employed a single signal path between their input and output terminals using a shunt feedback amplifier to provide such signal path, so that it is not capable of a good high frequency response because of the many time lags in the feedback loop. The output transistor driving the capacitive load must have a high voltage, high current capability resulting in a high collector junction capacitance which limits the high frequency response of such transistor. In addition, the load capacitance and the compensation capacitor across the feedback resistor of the shunt feedback amplifier further limits the frequency response of such prior circuits.

The amplifier circuit of the present invention overcomes these disadvantages by providing a separate high frequency signal path in parallel with the shunt feedback operational amplifier which then operates only as a low frequency signal path. The high frequency path is formed by a series feedback amplifier which has an extremely good high frequency response.

It is, therefore, one object of the present invention to provide an improved wide band amplifier for driving a capacitive load with large amplitude output signals.

Another object of the invention is to provide such an amplifier with a higher frequency response by employing two separate signal paths for high frequency and low frequency portions of the signal.

Another object of the invention is to provide such an amplifier in which the low frequency signal path is provided by a shunt feedback amplifier and the high frequency signal path is formed by a series feedback amplifier.

Still another object of the invention is to provide such an amplifier in which both signal paths have the same gain and their frequency responses overlap.

An additional object of the present invention is to provide such an amplifier circuit in which the shunt feedback amplifier is a D.C. coupled operational amplifier to provide extremely accurate low frequency amplification with very little drift in the D.C. output voltage level.

BRIEF DESCRIPTION OF DRAWINGS

Other objects and advantages will be apparent from the following detailed description of certain preferred embodiments of the invention and from the attached drawings of which.

DESCRIPTION OF PREFERRED EMBODIMENTS

Figures 1, 2, 3:
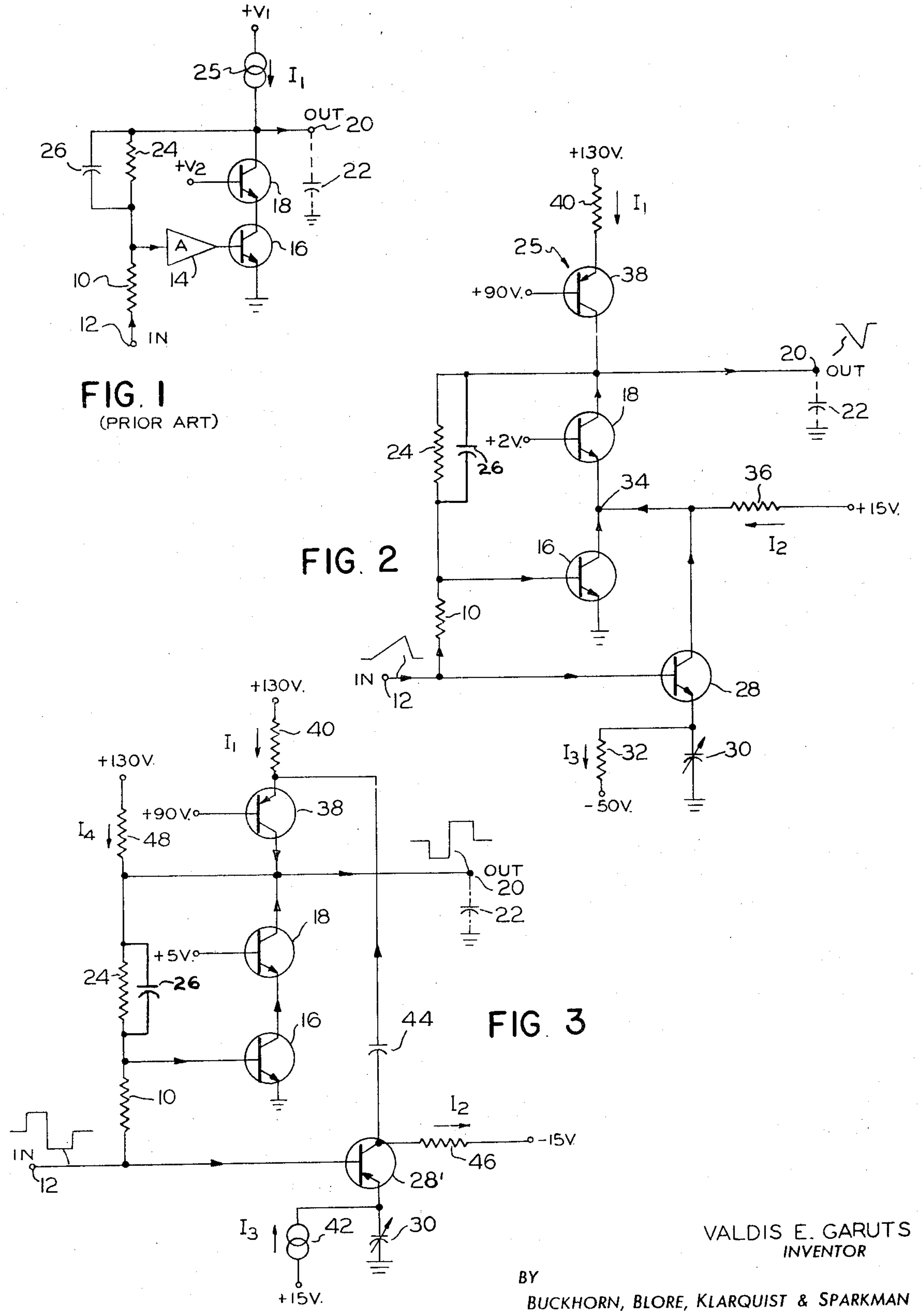
FIG. 1 (PRIOR ART), FIG. 2, FIG. 3
FIG. 1 is a schematic diagram of a prior art amplifier circuit.
FIG. 2 is a schematic diagram of one embodiment of the amplifier circuit of the present invention.
FIG. 3 is a schematic diagram of still another embodiment of the amplifier circuit of the present invention.

As shown in FIG. 1, previous horizontal sweep amplifiers used for driving the horizontal deflection plates of a cathode ray oscilloscope have a single signal path between the input and output of the amplifier which is provided by a shunt feedback amplifier. The shunt feedback amplifier includes an input coupling resistor 10 connected between an input terminal 12 and the input of a first amplifier stage 14. The output of amplifier stage 14 is connected to the base of the first NPN type transistor 16 connected as a common emitter amplifier with its emitter grounded. The collector of transistor 16 is connected to the emitter of a second NPN transistor 18 connected as a common base amplifier with its base connected to a source of positive D.C. supply voltage. Transistor 18 has its collector connected to an output terminal 20 to which a load capacitance 22 is connected so that it acts as an output transistor for driving such capacitive load. The load capacitance is shown in the dashed lines because it is formed by the capacitance of the horizontal deflection plates, not a physical capacitor. A shunt feedback resistor 24 is connected between the output terminal 20 and the input of the first amplifier stage 14. Such feedback resistor provides negative voltage feedback since transistor 16 is a voltage inverter amplifier so that the output signal is inverted with respect to the input signal. Thus, it can be seen that the prior art circuit of FIG. 1 is an operational amplifier whose gain is determined by the ratio of the feedback resistor 24 divided by the input coupling resistor 10. A source 25 of D.C. supply current $I_2$ is connected between a positive D.C. voltage source and the collector of transistor 18 to supply the operating current of transistors 16 and 18.

The shunt feedback operational amplifier of FIG. 1 has extremely good performance for low frequency signals including D.C. However, the high frequency response of this prior art circuit is not good because of the time lags within a feedback loop including a compensating capacitance 26 which is connected in parallel with the feedback resistor 24 to improve stability and to provide a better step signal transient response. In order to be capable of delivering an output signal of large voltage amplitude at output terminal 20, the output transistor 18 must be of a high voltage and high current capability which inherently means that its collector junction is of a high capacitance so that it cannot have a good high frequency response.

As shown in FIG. 2, the amplifier circuit of the present invention overcomes the disadvantages of the prior art circuit of FIG. 1 by adding a separate high frequency signal path in parallel with at least a portion of the low frequency path provided by the shunt feedback operational amplifier 10, 16, 18 and 24. The high frequency path is formed by a series feedback amplifier including a third transistor 28 of the NPN type connected as a common emitter amplifier with a series feedback capacitor 30 of about 70 picofarads connected between its emitter and ground. The emitter of transistor 28 is also connected to a source of D.C. supply current $I_3$ formed by a resistor 32 of 22 kilohms connected between such emitter and a negative D.C. voltage source of −50 volts. The base of transistor 28 is connected to the input terminal 12 while its collector is connected at a common connection 34 to the emitter of the output transistor 18 and to the collector of transistor 16. The high frequency path and the low frequency path have a common portion formed by the output transistor 18 between the common connection 34 and output terminal 20. Another source of D.C. supply current $I_2$ is connected to the collector of transistor 28 and is formed by a resistor 36 of 1.5 kilohms connected between such collector and a positive D.C. voltage source of +15 volts. Since the circuit of FIG. 2 is similar to that of FIG. 1, the same reference numbers are used for like parts and only the differences have been described.

The voltage gain of the series feedback amplifier in the high frequency signal path is determined by the ratio of the series feedback capacitor 30, divided by the load capacitance 22, and such gain is made equal to the gain of the shunt feedback operational amplifier in the low frequency signal path. The value of the output load capacitance 22 determines the low frequency cutoff for the high frequency signal path which is below the high frequency cutoff of the low frequency signal path. In the example given, the frequency response of the low frequency signal path is D.C. to about 30 megahertz, while the response of the high frequency signal path is about one megahertz to 200 megahertz. Thus, the amplifier has a minimum rise time of 1.5 nanoseconds for small signals which is the equivalent of a 200 megahertz high frequency response. The input coupling resistor 10 is 4.99 kilohms and the feed back resistor 24 is 49.9 kilohms so that the gain of the shunt feedback operational amplifier in the low frequency path is 10. Since the ratio of the series feedback capacitor 30, divided by the load capacitor 20, must also be ten, it follows that for a feedback capacitor of 70 picofarads, the load capacitance 22 is about 7 picofarads. It should be noted that the series feedback capacitance 30 may include a variable capacitor in order to enable more close matching of the gains of the two signal paths.

In FIG. 2, the current source 25 connected to the collector of the output transistor 18 may be formed by a fourth transistor 38 of PNP type connected as a common base amplifier whose base is connected to a positive D.C. voltage source of +90 volts and whose emitter is connected through a resistor 40 of 7.5 kilohms to a positive D.C. voltage source of +130 volts. This enables the amplifier circuit to produce a negative going sweep signal output of up to 80 volts amplitude and a rise time of about 3 nanoseconds which is applied to one horizontal deflection plate of an oscilloscope. The small signal high frequency response of the amplifier is about 200 megahertz for a 1.5 nanosecond rise time so such amplifier has a bandwidth of D.C. to about 200 megahertz. It should be noted that push-pull amplifier is employed to drive both horizontal deflection plates and may be formed by two amplifier circuits similar to that of FIG. 2 which may be interconnected through capacitor 30. However, the amplifier circuit which supplies the positive going sweep signal may be modified to provide completely separate signal paths like the circuit of FIG. 3, hereafter discussed.

FIG. 3 shows embodiment of the amplifier circuit of the present invention which may be employed as an unblanking amplifier in a cathode ray oscilloscope for driving the control grid of the cathode ray tube. This circuit differs from that of FIG. 2 in that the series feedback amplifier transistor 28′ is of a PNP type having its emitter connected to a source 32 of D.C. supply current $I_3$ having a positive D.C. voltage source of +15 volts. The collector of the series feedback transistor 28′ is connected through a D.C. blocking capacitor 44 to the emitter of transistor 38, not to the emitter of the output transistor 18. Thus, in this embodiment, the high frequency signal path through transistor 28′ and 38 is entirely separate from and parallel to the low frequency signal path through transistors 16 and 18. This circuit has the advantage that both positive going and negative going signals of fast rise time can be amplified.

Positive going output signals and negative going input signals corresponding thereto tend to cut off the NPN type transistors 28 and 18 of FIG. 2 which limits the speed of response. This problem is avoided in the circuit of FIG. 3 by changing transistor 28 to a PNP transistor 28′ and connecting the collector of transistor 28′ to the emitter of transistor 38 which is also of the PNP type and is not cutoff by such positive going signals.

The collector of transistor 28′ is connected to a source of D.C. supply current $I_2$ formed by a resistor 46 of 510 ohms connected between such collector and a negative D.C. voltage source of −15 volts. A fourth source of D.C. supply current $I_4$ may be provided by a resistor 48 of 9.9 kilohms connected between the collector of transistor 18 and a positive D.C. voltage source of +130 volts. However, this fourth current source is not essential.

It will be obvious to those having ordinary skill in the art that many changes may be made in the details of the above-described preferred embodiments of the invention without departing from the spirit of the invention. For example, current source $I_2$ in FIG. 2 and current source $I_4$ in FIG. 3 can be eliminated. Therefore, the scope of the present invention should only be determined by the following claims.

I claim:

1. An amplifier circuit having a load capacitance connected to its output terminal in which the improvement comprises:

first means for providing a low frequency signal path D.C. coupled between the input and output terminals of said amplifier circuit;

second means for providing a high frequency signal path between said input and output terminals with at least a portion of said high frequency path being separate from said low frequency path;

said high frequency path and said low frequency path being of substantially the same gain; and said high frequency path having a low frequency cutoff below the high frequency cutoff of said low frequency path so that their frequency ranges overlap.

2. An amplifier circuit having a load capacitance connected to its output terminal in which the improvement comprises:

first means including a first negative feedback amplifier having a shunt feedback impedance connected between its input and output for providing a low frequency signal path between the input and output terminals of said amplifier circuit;

second means including a second negative feedback amplifier having a series feedback impedance for providing a high frequency signal path between said input and output terminals with at least a portion of said high frequency path being separate from said low frequency path;

said high frequency path and said low frequency path being of substantially the same gain; and said high frequency path having a low frequency cutoff below the high frequency cutoff of said low frequency path.

3. An amplifier circuit in accordance with claim 2 in which the first feedback amplifier includes an input amplifier device connected as a phase inverter amplifier whose input is connected to said input terminal, and an output amplifier device connected as a noninverting voltage amplifier in cascade with said input amplifier device and having its output connected to said output terminal.

4. An amplifier circuit in accordance with claim 3 in which the second feedback amplifier includes a third amplifier device connected as a phase inverter amplifier.

5. An amplifier circuit in accordance with claim 4 in which the output amplifier device is an output transistor connected as a common base amplifier, and the input amplifier device is an input transistor connected as a common emitter amplifier with its collector connected to the emitter of said output transistor.

6. An amplifier circuit in accordance with claim 5 in which the first feedback amplifier is a D.C. coupled operational amplifier including a coupling resistor connected between the base of said input transistor and said input terminal, and the shunt feedback impedance is a feedback resistor connected between the collector of said output transistor and the base of said input transistor.

7. An amplifier circuit in accordance with claim 6 in which the third amplifier device is a third transistor connected as a common emitter amplifier having its base connected to said input terminal, and the series feedback impedance is a feedback capacitor connected to the emitter of said third transistor.

8. An amplifier circuit in accordance with claim 7 in which the ratio of the feedback capacitor to the load capacitance is substantially the same as the ratio of the feedback resistor to the coupling resistor.

9. An amplifier circuit in accordance with claim 7 in which the third transistor has its collector connected to a common connection at the collector of the input transistor and the emitter of the output transistor so that said output transistor forms a common path portion in both the low frequency path and the high frequency path.

10. An amplifier circuit in accordance with claim 9 which also has a plurality of sources of D.C. supply current including a first source connected to the collector of said output transistor, a second source connected to said common connection, and a third source connected to the emitter of said third transistor.

11. An amplifier circuit in accordance with claim 7 in which the third transistor has its collector connected to the emitter of a fourth transistor connected as a common base amplifier whose collector is connected to the output terminal so that the high frequency path is entirely separate from and parallel to the low frequency path.

12. An amplifier circuit in accordance with claim 11 in which a coupling capacitor is connected between the collector of said third transistor and the emitter of said fourth transistor.

13. An amplifier circuit in accordance with claim 12 which also has a plurality of sources of D.C. supply current including a first source connected to the emitter of the fourth transistor, a second source connected to the collector of the third transistor, a third source connected to the emitter of said third transistor, and a fourth source connected to a common connection at the collector of the output transistor and the collector of said fourth transistor.

14. An amplifier circuit in accordance with claim 2 in which the output terminal is connected to the horizontal deflection plates of a cathode ray tube to provide said load capacitance.

15. An amplifier circuit in accordance with claim 2 in which the output terminal is connected to the control grid of a cathode ray tube.

* * * * *

UNITED STATES PATENT OFFICE

CERTIFICATE OF CORRECTION

Patent No. 3,733,514 Dated May 15, 1973

Inventor(s) Valdis E. Garuts

It is certified that error appears in the above-identified patent and that said Letters Patent are hereby corrected as shown below:

In column 2, line 64, "$I_2$" should be --$I_1$--;

In column 4, line 24, before "embodiment" insert --another--;

In column 5, Claim 1, line 4, after "first means" insert --including a first negative feedback amplifier--

Claim 1, line 7, after "second means" insert --including a second negative feedback amplifier--.

Signed and sealed this 9th day of October 1973.

(SEAL)
Attest:

EDWARD M. FLETCHER, JR.
Attesting Officer

RENE D. TEGTMEYER
Acting Commissioner of Patents